United States Patent
Oyama

(10) Patent No.: US 11,750,916 B2
(45) Date of Patent: Sep. 5, 2023

(54) IMAGE PROCESSING APPARATUS, IMAGE PROCESSING METHOD, AND NON-TRANSITORY COMPUTER READABLE MEDIUM

(71) Applicant: CANON KABUSHIKI KAISHA, Tokyo (JP)

(72) Inventor: Yasufumi Oyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/666,915

(22) Filed: Feb. 8, 2022

(65) Prior Publication Data
US 2022/0166934 A1    May 26, 2022

Related U.S. Application Data

(63) Continuation of application No. 16/562,034, filed on Sep. 5, 2019, now abandoned.

(30) Foreign Application Priority Data

Sep. 6, 2018 (JP) ................. 2018-166930

(51) Int. Cl.
   *H04N 23/63* (2023.01)
   *H04N 5/272* (2006.01)
   *H04N 23/698* (2023.01)

(52) U.S. Cl.
   CPC ........... *H04N 23/633* (2023.01); *H04N 5/272* (2013.01); *H04N 23/698* (2023.01)

(58) Field of Classification Search
   CPC ......... H04N 5/232939; H04N 5/23238; H04N 5/272; H04N 21/21805; H04N 21/4223;
   (Continued)

(56) References Cited

U.S. PATENT DOCUMENTS 10,574,889 B2 * 2/2020 Rekimoto ............... G06T 11/60
2013/0106993 A1   5/2013 Schofield et al.
(Continued)

FOREIGN PATENT DOCUMENTS

CN    103141078 A    6/2013
CN    104429064 A    3/2015
(Continued)

OTHER PUBLICATIONS

Ronny D'Hoore (hereinafter D'Hoore) "Hiding the Tripod in a Sphere" Copyright © 2000 Proxy Vista AB, (pp. 1-8) (Year: 2000).*
(Continued)

*Primary Examiner* — Dramos Kalapodas
(74) *Attorney, Agent, or Firm* — Cowan, Liebowitz & Latman, P.C.

(57) ABSTRACT

An image processing apparatus according to the present invention includes at least one memory and at least one processor which function as: an acquisition unit configured to acquire an image captured by an image capturing apparatus, wherein a part of the image corresponding to a viewing direction is to be displayed on a screen; and a generation unit configured to generate a superimposed image by superimposing a graphic image on a specific part of the image corresponding to a specific viewing direction.

7 Claims, 7 Drawing Sheets

(58) Field of Classification Search
CPC ............ H04N 21/4312; H04N 21/816; H04N 21/85406; H04N 5/23216; H04N 5/23245; H04N 5/265; H04N 13/156; H04N 13/261; H04N 13/344; H04N 23/633; H04N 23/698; G06T 3/4038

See application file for complete search history.

(56) References Cited

U.S. PATENT DOCUMENTS

| | | |
|---|---|---|
| 2013/0314402 A1 | 11/2013 | Furumura et al. |
| 2019/0231430 A1 | 8/2019 | Friman et al. |
| 2019/0240508 A1 | 8/2019 | Friman et al. |
| 2019/0243138 A1 | 8/2019 | Peltola et al. |
| 2019/0306420 A1 | 10/2019 | Okaki et al. |
| 2019/0311459 A1 | 10/2019 | Zhu |
| 2019/0340737 A1 | 11/2019 | Kawaguchi et al. |
| 2019/0347766 A1 | 11/2019 | Kawaguchi et al. |
| 2019/0347775 A1* | 11/2019 | Suitoh .................. G06T 3/0062 |
| 2020/0213520 A1 | 7/2020 | Shoda |
| 2020/0296284 A1 | 9/2020 | Aikawa et al. |
| 2020/0296302 A1 | 9/2020 | Shiro et al. |

FOREIGN PATENT DOCUMENTS

| | | | |
|---|---|---|---|
| CN | 104509108 A | 4/2015 | |
| CN | 106548446 A | 3/2017 | |
| CN | 107835404 A | 3/2018 | |
| EP | 2627072 A1 | 8/2013 | |
| JP | 2003-244511 A | 8/2003 | |
| JP | 2009-021733 A | 1/2009 | |
| JP | 2013-066086 A | 4/2013 | |
| JP | 2016-091371 A | 5/2016 | |
| JP | 2016091371 A * | 5/2016 | ............ G03B 37/04 |
| JP | 2016-103806 A | 6/2016 | |
| WO | 2018/059146 A1 | 4/2018 | |

OTHER PUBLICATIONS

Ronny D'Hoore, "Hiding the Tripod in a Sphere" Copyright © 2000 Proxy Vista AB, (pp. 1-8).

The above Foreign Patent documents #3-4 and Non-Patent Literature Document #1 were cited in a European Search Report dated Jan. 7, 2020, which is enclosed, that issued in the corresponding European Patent Application No. 19190447.3.

The above Foreign Patent documents #5-9 were cited in a Mar. 29, 2021 Chinese Office Action, which is enclosed with an English Translation, that issued in Chinese Patent Application No. 201910841155.0.

The above foreign patent document was cited in the Aug. 9, 2022 Japanese Office Action, which is enclosed without an English Translation, that issued in Japanese Patent Application No. 2018-166930.

The above foreign patent documents were cited in the Jan. 17, 2023 Japanese Office Action, which is enclosed without an English Translation, that issued in Japanese Patent Application No. 2018-166930.

* cited by examiner

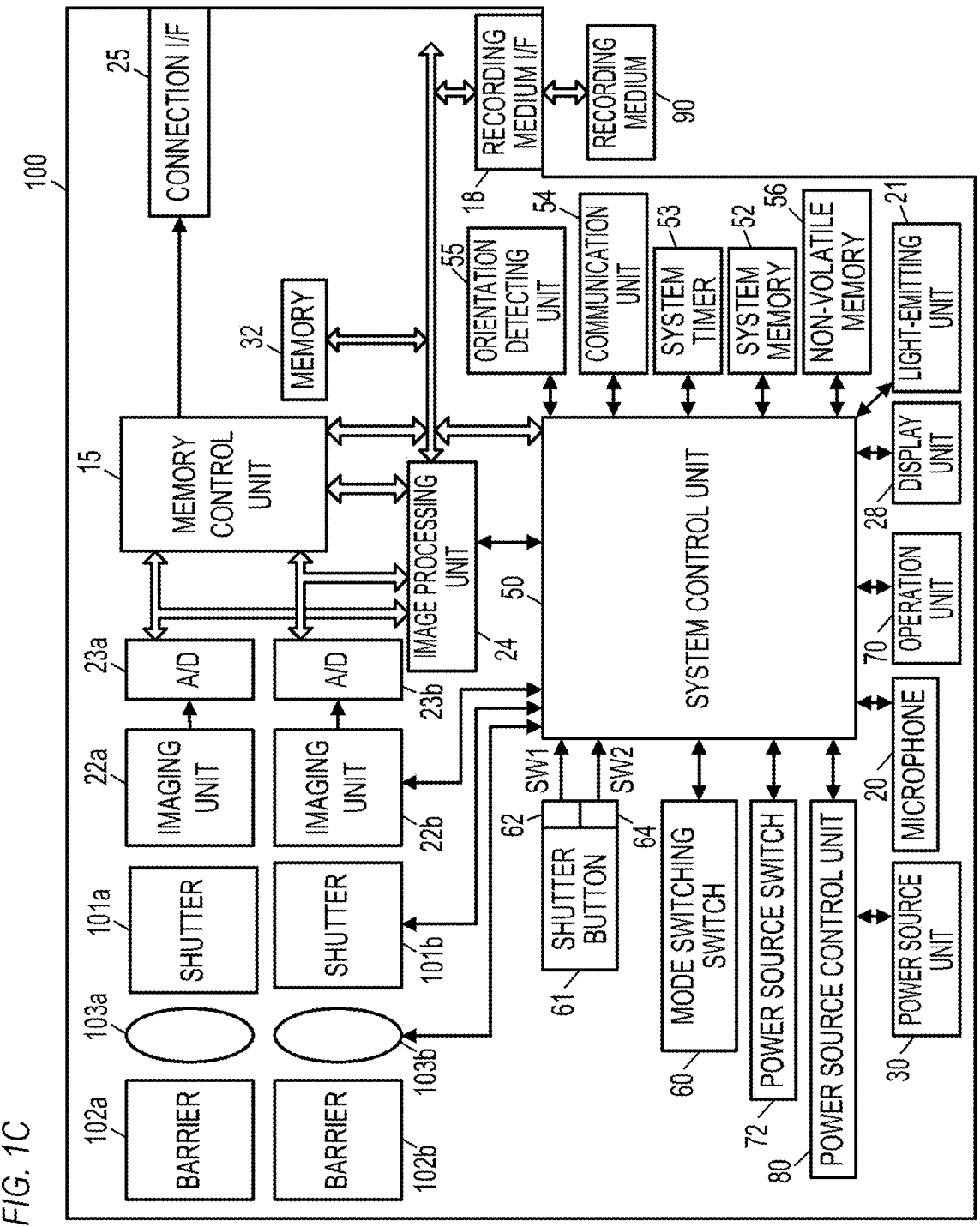

IMAGE PROCESSING APPARATUS, IMAGE PROCESSING METHOD, AND NON-TRANSITORY COMPUTER READABLE MEDIUM

CROSS-REFERENCE TO RELATED APPLICATION

This application is a continuation of application Ser. No. 16/562,034, filed Sep. 5, 2019, the entire disclosure of which is hereby incorporated by reference.

BACKGROUND OF THE INVENTION

Field of the Invention

The present invention relates to an image processing apparatus, an image processing method, and a non-transitory computer readable medium.

Description of the Related Art

There is known an imaging apparatus capable of easily capturing a fully spherical image in a 360-degree direction (omnidirectional image; all-around image; 360-degree image) by one shooting (capturing) operation. There is also known an imaging apparatus having, as a shooting range, a wide range of not less than 180 degrees, though not reaching 360 degrees. In addition, there is known a method in which part of an image captured by the above imaging apparatus (image of a wide area; wide-area image) is displayed as a display area in a display unit (display apparatus), and the display area is changed based on a user operation (including an orientation change of the display unit).

A photographer holding the imaging apparatus or a fixing device for fixing the imaging apparatus such as a tripod appears in the wide-area image that is a digital photograph. The photographer often stretches his/her hand supporting the imaging apparatus upwardly in order to capture an image in all directions equally. Consequently, it is highly probable that the photographer or the fixing device appears in an area where an image in a ground direction is shown.

An imaging apparatus described in Japanese Patent Application Publication No. 2003-244511 has a configuration in which a grip is provided immediately below the imaging apparatus, and areas immediately below and above the imaging apparatus are not imaged such that neither of the photographer nor the fixing device is imaged. However, in the case of the imaging apparatus described in Japanese Patent Application Publication No. 2003-244511, since the areas immediately below and above the imaging apparatus are not imaged, it is not possible to obtain a complete omnidirectional image.

SUMMARY OF THE INVENTION

When a target image (a target image to be displayed) is displayed in a display apparatus, information associated with the target image and a graphic image (text or an icon) indicative of the state of the display apparatus are sometimes displayed. A common method for displaying the graphic image includes a method in which the graphic image is superimposed on the target image and displayed, and a method in which the target image is displayed as a small image in part of a display surface, and the graphic image is displayed in another part (blank) of the display surface. However, in the first method, the graphic image is superimposed on the target image, and hence there are cases where viewing of the target image is hindered by the graphic image. In the second method, the target image is displayed as the small image, and hence viewability of the target image is reduced.

According to a technique described in Japanese Patent Application Publication No. 2009-21733, any of a plurality of templates is selected in response to a user operation, and text information is displayed at a position corresponding to the selected template. However, even when the technique described in Japanese Patent Application Publication No. 2009-21733 is used, the position corresponding to the selected template is not always an optimum position, and there are cases where the viewing of the target image is hindered by the graphic image.

To cope with this, the present invention provides a technique that allows a graphic image to be displayed more suitably in the case where part of a wide-area image is displayed as a display area in a display unit and the graphic image is further displayed.

The present invention in its first aspect provides an image processing apparatus comprising at least one memory and at least one processor which function as:

an acquisition unit configured to acquire an image captured by an image capturing apparatus, wherein a part of the image corresponding to a viewing direction is to be displayed on a screen; and a generation unit configured to generate a superimposed image by superimposing a graphic image on a specific part of the image corresponding to a specific viewing direction.

The present invention in its second aspect provides an image processing method comprising:

acquiring an image captured by an image capturing apparatus, wherein a part of the image corresponding to a viewing direction is to be displayed on a screen; and generating a superimposed image by superimposing a graphic image on a specific part of the image corresponding to a specific viewing direction.

The present invention in its third aspect provides a non-transitory computer readable medium that stores a program, wherein the program causes a computer to execute:

acquiring an image captured by an image capturing apparatus, wherein a part of the image corresponding to a viewing direction is to be displayed on a screen; and generating a superimposed image by superimposing a graphic image on a specific part of the image corresponding to a specific viewing direction.

According to the present invention, in the case where part of the wide-area image is displayed as the display area in the display unit and the graphic image is further displayed, it becomes possible to display the graphic image more suitably.

Further features of the present invention will become apparent from the following description of exemplary embodiments with reference to the attached drawings.

BRIEF DESCRIPTION OF THE DRAWINGS

Each of FIGS. 1A and 1B is an external view of a digital camera according to the present embodiment.

DESCRIPTION OF THE EMBODIMENTS

Figure 1A:
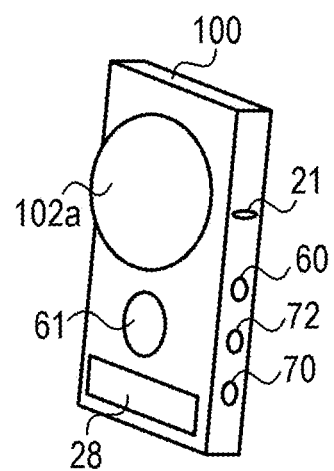
FIG. 1C is a block diagram of the digital camera according to the present embodiment.
Figure 1B:
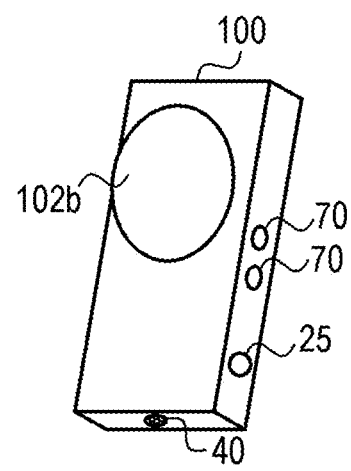

Hereinbelow, preferred embodiments of the present invention will be described with reference to the drawings. FIG. 1A is a front perspective view (external view) of a digital camera 100 that is an example of an imaging apparatus according to the present embodiment. FIG. 1B is a rear perspective view (external view) of the digital camera 100. The digital camera 100 is a camera (omnidirectional camera; spherical camera) for capturing an omnidirectional image (spherical image).

A barrier 102a is a protective window for a front camera unit that has a range ahead of the digital camera 100 as a shooting range. The front camera unit is, e.g., a wide-angle camera unit that has, as the shooting range, a wide range of not less than 180 degrees in each of an up-and-down direction and a left-and-right direction ahead of the digital camera 100. A barrier 102b is a protective window for a rear camera unit that has a range behind the digital camera 100 as a shooting range. The rear camera unit is, e.g., a wide-angle camera unit that has, as the shooting range, a wide range of not less than 180 degrees in each of the up-and-down direction and the left-and-right direction behind the digital camera 100.

A display unit 28 displays various information. A shutter button 61 is an operation unit (operation member) for providing a shooting instruction. A mode switching switch 60 is an operation unit for switching among various modes. A connection I/F 25 is a connector for connecting a connection cable to the digital camera 100, and external apparatuses such as a smart phone, a personal computer, and a television apparatus are connected to the digital camera 100 by using the connection cable. Operation units 70 are various switches, buttons, dials, or touch sensors for receiving various operations from a user. A power source switch 72 is a push button for switching a power source between ON and OFF states.

A light-emitting unit (light-emitting member) 21 is a light-emitting diode (LED) or the like, and the light-emitting unit 21 notifies the user of various states of the digital camera 100 by using light emission patterns and colors of emitted light. A fixing unit 40 is, e.g., a tripod screw hole, and is used for fixing and installing the digital camera 100 with a fixing device such as a tripod.

FIG. 1C is a block diagram showing an example of the configuration of the digital camera 100.

The barrier 102a covers imaging systems (an imaging lens 103a, a shutter 101a, and an imaging unit 22a) of the front camera unit to thereby prevent the imaging systems from being soiled or damaged. The imaging lens 103a is a lens group including a zoom lens and a focus lens, and is a wide-angle lens. The shutter 101a is a shutter having diaphragm function of adjusting an amount of object light incident on the imaging unit 22a. The imaging unit 22a is an imaging device (imaging sensor) constituted by a CCD or a CMOS device that converts an optical image into an electrical signal. An A/D converter 23a converts an analog signal outputted from the imaging unit 22a into a digital signal. The imaging lens 103a, the shutter 101a, and the imaging unit 22a are controlled by a system control unit 50. Note that, instead of providing the barrier 102a, the outer surface of the imaging lens 103a may be exposed, and the other imaging systems (the shutter 101a and the imaging unit 22a) may be prevented from being soiled or damaged by the imaging lens 103a.

The barrier 102b covers imaging systems (an imaging lens 103b, a shutter 101b, and an imaging unit 22b) of the rear camera unit to thereby prevent the imaging systems from being soiled or damaged. The imaging lens 103b is a lens group including a zoom lens and a focus lens, and is a wide-angle lens. The shutter 101b is a shutter having diaphragm function of adjusting an amount of object light incident on the imaging unit 22b. The imaging unit 22b is an imaging device constituted by a CCD or a CMOS device that converts an optical image into an electrical signal. An A/D converter 23b converts an analog signal outputted from the imaging unit 22b into a digital signal. The imaging lens 103b, the shutter 101b, and the imaging unit 22b are controlled by the system control unit 50. Note that, instead of providing the barrier 102b, the outer surface of the imaging lens 103b may be exposed, and the other imaging systems (the shutter 101b and the imaging unit 22b) may be prevented from being soiled or damaged by the imaging lens 103b.

A virtual reality (VR) image is captured by the imaging unit 22a and the imaging unit 22b. The VR image is assumed to be an image capable of VR display (display in a display mode "VR view"). The VR image is assumed to include an omnidirectional image (spherical image) captured by an omnidirectional camera (spherical camera), and a panorama image having an image area (effective image area) wider than a display area that can be displayed at a time in a display unit. In addition to a still image, the VR image includes a video and a live image (an image acquired substantially in real time from a camera). The VR image has the maximum image area (effective image area) corresponding to a field of view of 360 degrees in the up-and-down direction (a vertical angle, an angle from the zenith, an elevation angle, a depression angle, an altitude angle, a pitch angle) and 360 degrees in the left-and-right direction (a horizontal angle, an azimuth angle, a yaw angle).

In addition, the VR image is assumed to include an image having an angle of view (field-of-view area) wider than the angle of view of a typical camera, or an image having an image area (effective image area) wider than a display area that can be displayed at a time in a display unit even if the angle of view or the image area is smaller than 360 degrees in the up-down direction and smaller than 360 degrees in the left-right direction. For example, an image captured by a spherical camera capable of capturing an image of an object corresponding to a field of view (angle of view) of an angle of 360 degrees in the left-and-right direction (the horizontal angle, the azimuth angle) and a vertical angle of 210 degrees having the zenith as the center is a kind of the VR image. In addition, for example, an image captured by a camera capable of capturing an image of an object corresponding to a field of view (angle of view) of an angle of 180 degrees in the left-and-right direction (the horizontal direction, the azimuth direction) and a vertical angle of 180 degrees having the horizontal direction as the center is a kind of the VR image. That is, an image having an image area corresponding to a field of view of not less than 160 degrees (±80 degrees) in each of the up-and-down direction and the left-and-right direction, and having an image area wider than an area that can be visually recognized at a time by man is a kind of the VR image.

When the VR image is displayed according to the VR display (displayed in the display mode "VR view"), it is possible to view an omnidirectional image that is seamless in the left-and-right direction (horizontal rotation direction) by changing the orientation of a display apparatus (a display apparatus for displaying the VR image) in a left-and-right rotation direction. It is possible to view an omnidirectional image that is seamless in a range of ±105 degrees when viewed from immediately above (the zenith) in the up-and-down direction (vertical rotation direction), but a region in a range exceeding 105 degrees when viewed from immediately above is a blank region in which an image is not present. The VR image can also be described as "an image in which an image area is at least part of virtual space (VR space)".

The VR display (VR view) is a display method (display mode) which is capable of changing the display area, and displays an image in part of a field-of-view area (display area; display region) in the VR image corresponding to a viewing direction designated by the orientation of the display apparatus. In the case where the VR image is viewed with a head-mounted display (HMD) serving as the display apparatus, an image in the field-of-view area corresponding to the orientation of the face of the user is displayed. For example, it is assumed that, in the VR image, an image of a view angle (angle of view) that has an angle of 0 degrees in the left-and-right direction (specific azimuth, e.g., the north) and has an angle of 90 degrees in the up-and-down direction (90 degrees from the zenith, i.e., horizontal) as the center is displayed at some point of time. In this state, when the orientation of the display apparatus is turned inside out (e.g., when the display surface that is directed southward is directed northward), in the same VR image, the display area is changed and an image of a view angle that has an angle of 180 degrees in the left-and-right direction (opposite azimuth, e.g., the south) and has an angle of 90 degrees in the up-and-down direction (horizontal) as the center is displayed. In the case where the user views the HMD, when the user turns his/her face toward the south from the north (i.e., when the user faces rearward), the image displayed in the HMD is changed from an image of the north to an image of the south. With the VR display described above, it is possible to give the user the feeling (sense of immersion) of being in the VR image (in the VR space) visually. A smart phone mounted to VR goggles (head-mounted adaptor) can be described as a kind of the HMD.

Note that the display method of the VR image is not limited to the VR display described above. A user operation performed on a predetermined operation member such as the touch panel or a direction button may be detected (operation detection) instead of the orientation change, and the display area may be moved (scrolled) in response to the user operation. Examples of the user operation performed on the predetermined operation member include Touch-Move performed on the touch panel, a drag operation performed on a mouse or the like, and a press operation of the direction button. At the time of the VR display (at the time of the display mode "VR view"), both of a process for changing the display area in response to the orientation change and a process for changing the display area in response to the user operation performed on the predetermined operation member may be performed.

An image processing unit 24 performs predetermined processing (pixel interpolation, resizing processing such as size reduction, and color conversion processing) on data from the A/D converter 23a and the A/D converter 23b, or data from a memory control unit 15. In addition, the image processing unit 24 performs predetermined arithmetic processing by using captured image data. The system control unit 50 performs exposure control and distance measurement control based on the result of arithmetic calculation obtained by the image processing unit 24. With this, autofocus (AF) processing, auto exposure (AE) processing, and electronic flash pre-emission (EF) processing are performed. Further, the image processing unit 24 performs predetermined arithmetic processing by using the captured image data, and performs auto white balance (AWB) processing based on the obtained result of arithmetic calculation. In addition, the image processing unit 24 performs basic image processing on two images (two fish-eye images; two wide-angle images) obtained by the A/D converter 23a and the A/D converter 23b, and performs image connection processing for combining the two images having been performed the basic image processing. With this, a single VR image is generated. Further, the image processing unit 24 performs image cut-out processing, enlargement processing, and distortion correction for performing the VR display of the VR image at the time of the VR display when live view is used or at the time of reproduction, and performs rendering in which the processing result is rendered in a predetermined storage area (VRAM) in a memory 32.

In the image connection processing, the image processing unit 24 uses one of the two images as a reference image and uses the other of the two images as a comparison image, calculates an amount of displacement between the reference image and the comparison image for each area by pattern matching processing, and detects a connection position where the two images are connected to each other based on the displacement amount of each area. Subsequently, the image processing unit 24 corrects the distortion of each image by geometrical transformation while considering the detected connection position and lens characteristics of each optical system. With this, each image is converted into an image of a spherical format (spherical image format). Then, the image processing unit 24 generates one spherical image (VR image) by combining (blending) two images of the spherical format. The generated spherical image is an image that uses, e.g., equidistant cylindrical projection, and it is possible to associate the position of each pixel of the spherical image with coordinates on the surface of a sphere (VR space).

Output data from the A/D converters 23a and 23b is written into the memory 32 via the image processing unit 24 and the memory control unit 15 or via the memory control unit 15 without the intervention of the image processing unit 24. The memory 32 stores image data that is obtained by the imaging units 22a and 22b and is converted into digital data by the A/D converters 23a and 23b, and image data that is to be outputted to an external display apparatus from the connection I/F 25. The memory 32 has a storage capacity that is sufficient enough to store a predetermined number of still images, a video of a predetermined time period, and sound.

In addition, the memory 32 also serves as a memory for image display (video memory). Data for image display stored in the memory 32 can be outputted to the external display apparatus from the connection I/F 25. By sequentially transferring the VR images captured by the imaging units 22a and 22b, generated by the image processing unit 24, and accumulated in the memory 32 to the external display apparatus and displaying the VR images, it is possible to implement function as an electronic view finder, and implement live view display (LV display). Hereinafter, an image displayed according to the live view display is referred to as a live view image (LV image). Similarly, it is possible to implement the live view display (remote LV display) by sequentially transferring the VR images accumulated in the memory 32 to an external apparatus (a smart phone or the like) that is wirelessly connected via a communication unit 54 and displaying the VR images.

Note that the digital camera 100 may include a main body display unit capable of displaying an image. An image similar to the image described as the image that is outputted from the connection I/F 25 and displayed in the external display apparatus may be able to be displayed in the main body display unit.

A non-volatile memory 56 is a memory serving as an electrically erasable/recordable recording medium, and is, e.g., an EEPROM or the like. In the non-volatile memory 56, constants and programs for the operation of the system control unit 50 are recorded. The programs mentioned herein denote computer programs for executing various flowcharts described later in the present embodiment.

The system control unit 50 is a control unit that has at least one processor or one circuit, and controls the entire digital camera 100. The system control unit 50 implements each processing of the present embodiment described later by executing the programs recorded in the non-volatile memory 56 described above. A system memory 52 is, e.g., a RAM, and the system control unit 50 loads constants and variables for the operation of the system control unit 50, and the programs read from the non-volatile memory 56 into the system memory 52. In addition, the system control unit 50 performs display control by controlling the memory 32, the image processing unit 24, and the memory control unit 15. A system timer 53 is a time measurement unit that measures time used for various control operations and time of an integrated clock.

The mode switching switch 60, the shutter button 61, the operation units 70, and the power source switch 72 are used for inputting various operation instructions to the system control unit 50.

The mode switching switch 60 switches the operation mode of the system control unit 50 to any of a still image recording mode, a video shooting mode, a reproduction mode, and a communication connection mode. The still image recording mode includes an automatic shooting mode, an automatic scene determination mode, a manual mode, a diaphragm priority mode (Av mode), a shutter speed priority mode (Tv mode), and a program AE mode. In addition, the still image recording mode includes various scene modes and custom modes serving as shooting settings of each shooting scene. The user can directly switch the operation mode to any of these modes using the mode switching switch 60. Alternatively, after a screen is switched to a list screen of shooting modes by using the mode switching switch 60, the operation mode may be selectively switched to any of a plurality of modes displayed in the display unit 28 by using other operation members. Similarly, the video shooting mode may include a plurality of modes.

The shutter button 61 includes a first shutter switch 62 and a second shutter switch 64. The first shutter switch 62 is turned ON by what is called a half-press operation (shooting preparation instruction) in the process of the operation of the shutter button 61, and generates a first shutter switch signal SW1. With the first shutter switch signal SW1, the system control unit 50 starts a shooting preparation operation such as the autofocus (AF) processing, the auto exposure (AE) processing, the auto white balance (AWB) processing, or the electronic flash pre-emission (EF) processing. The second shutter switch 64 is turned ON by what is called a full-press operation (shooting instruction) when the operation of the shutter button 61 is completed, and generates a second shutter switch signal SW2. With the second shutter switch signal SW2, the system control unit 50 starts a series of operations of shooting processing from reading of signals from the imaging units 22a and 22b to writing of image data into a recording medium 90.

Note that the shutter button 61 is not limited to the operation member capable of operations in two stages that are the full-press operation and the half-press operation, and may also be an operation member capable of a press operation in one stage. In this case, the shooting preparation operation and the shooting processing are successively performed with the press operation in one stage. This is an operation identical to that in the case where the shutter button capable of the half-press operation and the full-press operation is pressed all the way down (in the case where the first shutter switch signal SW1 and the second shutter switch signal SW2 are generated almost simultaneously).

A function is assigned to the operation unit 70 appropriately for each scene by choosing and operating various function icons and choices displayed in the display unit 28, and the operation units 70 function as various function buttons. Examples of the function button include an end button, a return button, an image feed button, a jump button, a stop-down button, and an attribute change button. For example, when a menu button is pressed down, a menu screen on which various settings can be performed is displayed in the display unit 28. The user can perform various settings intuitively by operating the operation units 70 while looking at the menu screen displayed in the display unit 28.

The power source switch 72 is the push button for switching the power source between ON and OFF states. A power source control unit 80 is constituted by a battery detection circuit, a DC-DC converter, and a switch circuit for switching a block to be energized, and detects the presence or absence of a mounted battery, the type of the battery, and a remaining battery level. In addition, the power source control unit 80 controls the DC-DC converter based on the detection result and the instruction of the system control unit 50, and supplies required voltages to the individual units including the recording medium 90 for required time periods. A power source unit 30 is constituted by a primary battery such as an alkaline battery or a lithium battery, a secondary battery such as a NiCd battery, a NiMH battery, or a Li battery, and an AC adaptor.

A recording medium I/F 18 is an interface with the recording medium 90 such as a memory card or a hard disk. The recording medium 90 is a recording medium for recording a captured image such as a memory card or the like, and is constituted by a semiconductor memory, an optical disk, or a magnetic disk. The recording medium 90 may be an exchangeable recording medium that can be attached to and detached from the digital camera 100, and may also be a recording medium integrated in the digital camera 100.

The communication unit 54 performs transmission and reception of an image signal and a sound signal between the communication unit 54 and an external apparatus that is connected to the communication unit 54 wirelessly or using a cable. The communication unit 54 can be connected to a wireless local area network (LAN) and the Internet, and can communicate with an external apparatus (a server or the like) on the network via the network. In addition, the communication unit 54 can communicate with the external apparatus using Bluetooth (registered trademark) or Bluetooth Low Energy. The communication unit 54 can transmit the image (including the LV image) captured by the imaging units 22a and 22b and the image recorded in the recording medium 90, and can receive the image and other various information from the external apparatus.

An orientation detection unit 55 detects the orientation of the digital camera 100 with respect to the direction of gravity. It is possible to determine whether the image captured by the imaging units 22a and 22b is an image captured by the digital camera 100 that is held widthwise or an image captured by the digital camera 100 that is held lengthwise based on the orientation detected by the orientation detection unit 55. In addition, it is possible to determine whether or not the image captured by the imaging units 22a and 22b is an image captured by the digital camera 100 that is inclined in a rotation direction such as a yaw direction, a pitch direction, or a roll direction, and it is also possible to determine an amount of the inclination. The system control unit 50 can add orientation information corresponding to the orientation detected by the orientation detection unit 55 to an image file of the VR image captured by the imaging units 22a and 22b, and rotate (adjust the orientation of the image such that inclination correction (zenith correction) is performed) and record the image. As the orientation detection unit 55, a plurality of sensors such as an acceleration sensor, a gyro sensor, a geomagnetic sensor, an azimuth sensor, and an altitude sensor may be used alone or in combination of two or more. It is also possible to detect the movement of the digital camera 100 (the digital camera 100 is paned, tilted, lifted, or still or not) by using the acceleration sensor, the gyro sensor, and the azimuth sensor that constitute the orientation detection unit 55.

A microphone 20 picks up sound around the digital camera 100 that is recorded as the sound of the VR image (VR video) that is a video. The connection I/F 25 is a connection plug to which an HDMI (registered trademark) cable or a USB cable is connected in order to connect to the external apparatus and perform transmission and reception of an image.

Figure 2A:
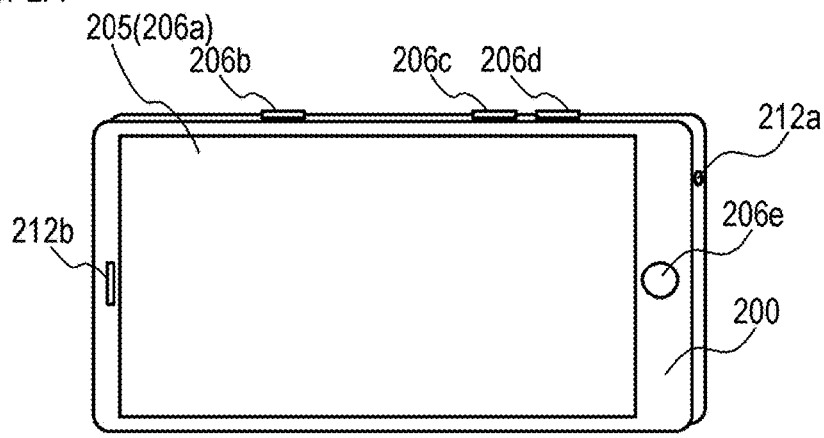
FIG. 2A is an external view of a display apparatus according to the present embodiment.

FIG. 2A is an external view of a display apparatus 200 that is an example of a display control apparatus according to the present embodiment. The display apparatus 200 is, e.g., a smart phone or the like. A display unit 205 displays images and various information. The display unit 205 is constituted integrally with a touch panel 206a, and can detect touch operations performed on the display surface of the display unit 205. The display apparatus 200 can perform the VR display of the VR image (VR contents) generated by the digital camera 100 or the like in the display unit 205. An operation unit 206b is a power source button that receives an operation for switching a power source of the display apparatus 200 between ON and OFF states. An operation unit 206c and an operation unit 206d are volume buttons for turning up and down the volume of sound outputted from a sound output unit 212. An operation unit 206e is a home button for causing the display unit 205 to display a home screen. A sound output terminal 212a is an earphone jack, and is a terminal for outputting a sound signal to an earphone or an external speaker. A speaker 212b is an integrated speaker for outputting sound.

Figure 2B:
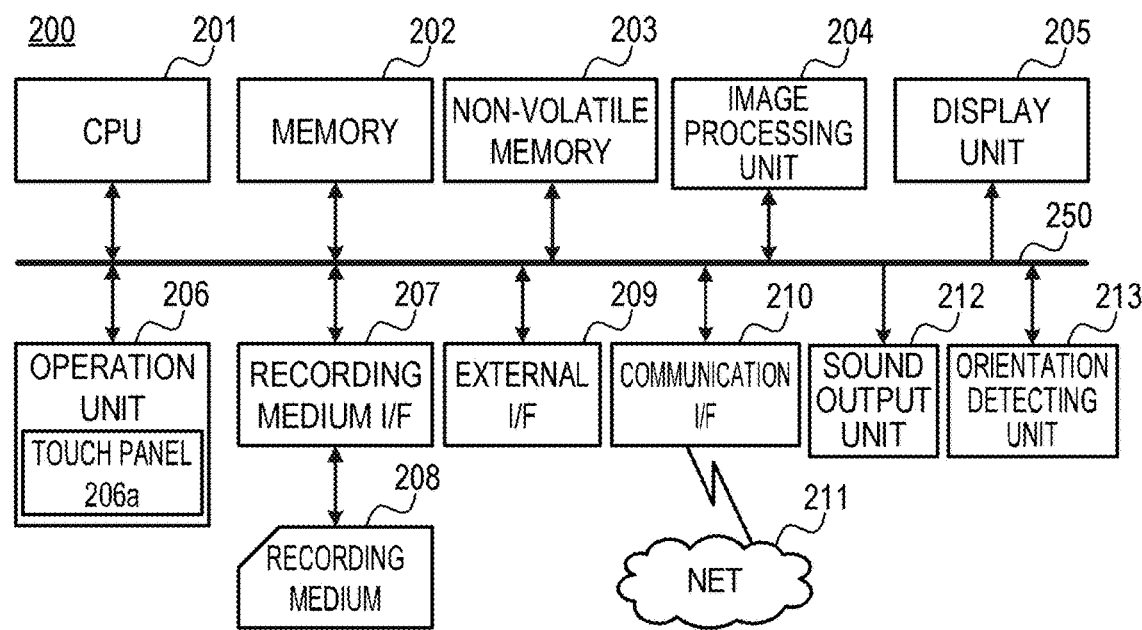
FIG. 2B is a block diagram of the display apparatus according to the present embodiment.

FIG. 2B is a block diagram showing an example of the configuration of the display apparatus 200. To an internal bus 250, a CPU 201, a memory 202, a non-volatile memory 203, an image processing unit 204, a display unit 205, an operation unit 206, a recording medium I/F 207, an external I/F 209, and a communication I/F 210 are connected. In addition, to the internal bus 250, the sound output unit 212 and an orientation detection unit 213 are connected. The individual units connected to the internal bus 250 are configured to be able to exchange data with each other via the internal bus 250.

The CPU 201 is a control unit that controls the entire display apparatus 200, and is constituted by at least one processor or one circuit. The memory 202 is constituted by, e.g., a RAM (a volatile memory that uses a semiconductor device). The CPU 201 controls the individual units of the display apparatus 200 by, e.g., using the memory 202 as a work memory according to a program stored in the non-volatile memory 203. The non-volatile memory 203 stores image data, sound data, other data, and various programs for operation of the CPU 201. The non-volatile memory 203 is constituted by, e.g., a flash memory or a ROM.

The image processing unit 204 performs various image processing on the image stored in the non-volatile memory 203 or a recording medium 208, the image signal acquired via the external I/F 209, and the image acquired via the communication I/F 210 based on the control of the CPU 201. The image processing performed by the image processing unit 204 includes A/D conversion processing, D/A conversion processing, coding processing of image data, compression processing, decoding processing, enlargement/reduction processing (resizing), noise reduction processing, and color conversion processing. In addition, the image processing unit 204 performs various image processing such as panoramic expansion, mapping processing, and conversion of the VR image that is an omnidirectional image or a wide-area image having a wide-area image, though not the omnidirectional image. The image processing unit 204 may also be constituted by a dedicated circuit block for performing specific image processing. In addition, depending on the type of image processing, the CPU 201 can perform the image processing according to a program without using the image processing unit 204.

The display unit 205 displays images and a GUI screen constituting a graphical user interface (GUI) based on the control of the CPU 201. The CPU 201 controls the individual units of the display apparatus 200 such that a display control signal is generated according to a program, and an image signal to be displayed in the display unit 205 is generated and outputted to the display unit 205. The display unit 205 displays the image based on the generated image signal. Note that the configuration of the display control apparatus according to the present embodiment may include up to the interface for outputting the image signal to be displayed in the display unit 205, and the display unit 205 may be constituted by an external monitor (a television apparatus or an HMD).

The operation unit 206 is an input device for receiving user operations that includes a text information input device such as a keyboard or the like, a pointing device such as a mouse or a touch panel, a button, a dial, a joystick, a touch sensor, and a touch pad. In the present embodiment, the operation unit 206 includes the touch panel 206a, and the operation units 206b, 206c, 206d, and 206e.

The recording medium 208 such as a memory card, a CD, or a DVD can be attached to and detached from the recording medium I/F 207. The recording medium I/F 207 reads data from the recording medium 208 attached to the recording medium I/F 207, and writes data into the recording medium 208 based on the control of the CPU 201. For example, as the recording medium 208, it is possible to attach the recording medium 90 in which the spherical image generated by the digital camera 100 is recorded. In this case, the image signal of the VR image can be read from the recording medium 208 and displayed in the display unit 205. The external I/F 209 is an interface that is connected to an external apparatus with a cable or wirelessly and is used for performing input and output of the image signal and the sound signal. The communication I/F 210 is an interface that communicates with the external apparatus and the Internet 211 and is used for performing transmission and reception of various data such as a file and a command. The communication I/F 210 can communicate with external equipment using, e.g., a wireless LAN, a wired LAN, Bluetooth (registered trademark), or Bluetooth Low Energy.

The sound output unit 212 outputs sound of a video and music data (sound file), an operation tone, a ring tone, and various notification sounds. The sound output unit 212 is assumed to include the sound output terminal 212a to which an earphone or the like is connected and the speaker 212b, but the sound output unit 212 may also output sound data to an external speaker using wireless communication or the like.

The orientation detection unit 213 detects the orientation of the display apparatus 200 with respect to the direction of gravity. It is possible to determine whether the display apparatus 200 is held widthwise or lengthwise, whether the display apparatus 200 is directed upward or downward, and whether or not the display apparatus 200 is held obliquely based on the orientation detected by the orientation detection unit 213. In addition, it is also possible to determine the presence or absence of the inclination of the display apparatus 200 in the rotation direction such as the yaw direction, the pitch direction, or the roll direction and an amount of the inclination, and determine whether or not the display apparatus 200 has rotated in the rotation direction. As the orientation detection unit 213, a plurality of sensors such as the acceleration sensor, the gyro sensor, the geomagnetic sensor, the azimuth sensor, and the altitude sensor may be used alone or in combination of two or more. Note that, in the case where the display control apparatus according to the present embodiment is separate from the display apparatus (in the case where the display unit 205 is an external monitor), the orientation detection unit 213 may be provided not in the display control apparatus but in the display apparatus.

As described above, the operation unit 206 includes the touch panel 206a. The touch panel 206a is an input device that is flatly formed to be stacked on the display unit 205, and outputs coordinate information corresponding to a contact position. The CPU 201 can detect the following operations performed on the touch panel 206a or states.

that a finger or a pen that does not touch the touch panel 206a newly touches the touch panel 206a, i.e., a start of touch (hereinafter referred to as "Touch-Down")

a state in which the finger or the pen touches the touch panel 206a (hereinafter referred to as "Touch-On")

that the finger or the pen that touches the touch panel 206a moves (hereinafter referred to as "Touch-Move")

that the finger or the pen that touches the touch panel 206a moves away from the touch panel 206a, i.e., an end of touch (hereinafter referred to as Touch-Up)

a state in which nothing touches the touch panel 206a (hereinafter referred to as Touch-Off)

When Touch-Down is detected, Touch-On is detected simultaneously. After the detection of Touch-Down, as long as Touch-Up is not detected, Touch-On is continuously detected usually. Also in the case where Touch-Move is detected, Touch-On is detected simultaneously. Even when Touch-On is detected, in the case where the touch position is not moved, Touch-Move is not detected. When Touch-Up of all fingers or the pen that touches the touch panel is detected, Touch-Off is detected.

The CPU 201 is notified of these operations and states, and position coordinates of the position of touch of the finger or the pen on the touch panel 206a via the internal bus, and determines which operation (touch operation) has been performed on the touch panel 206a based on the information of which the CPU 201 has been notified. With regard to Touch-Move, it is possible to determine the movement direction of the finger or the pen that moves on the touch panel 206a for each vertical component and each horizontal component on the touch panel 206a based on the change of the position coordinates. In the case where Touch-Move having a predetermined distance or more is detected, it is determined that a sliding operation has been performed.

An operation in which the finger that touches the touch panel 206a is quickly moved by a certain distance and is then moved away from the touch panel 206a is called a flick. The flick is, i.e., an operation that slides the finger on the touch panel 206a quickly in such a manner as to flick the finger against the touch panel 206a. When Touch-Move having a predetermined distance or more and having a predetermined speed or higher is detected and Touch-Up is also detected, it is possible to determine that the flick has been performed (it is possible to determine that the flick has been performed subsequently to the sliding operation).

Further, a touch operation in which a plurality of places (e.g., two points) are touched simultaneously and the touch positions are brought close to each other is referred to as pinch-in, and a touch operation in which the touch positions are moved away from each other is referred to as pinch-out. The pinch-in and the pinch-out are collectively referred to as a pinch operation (or simply a pinch). The touch panel 206a used herein may have any of various touch panel systems such as a resistive membrane system, an electrostatic capacitance system, a surface acoustic wave system, an infrared system, an electromagnetic induction system, an image recognition system, and an optical sensor system. There is a system that detects touch based on contact with the touch panel and a system that detects touch based on approach of the finer or the pen to the touch panel, and either system may be used.

Figure 2C:
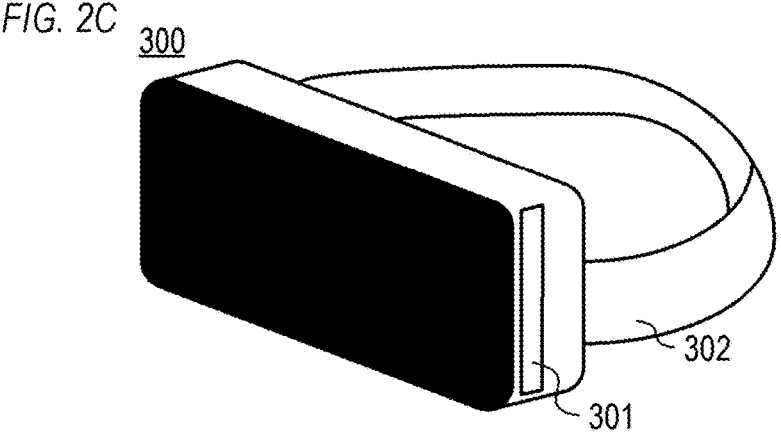
FIG. 2C is an external view of VR goggles according to the present embodiment.

FIG. 2C is an external view of VR goggles (head-mounted adaptor) 300 to which the display apparatus 200 can be mounted. The display apparatus 200 is mounted to the VR goggles 300, and the display apparatus 200 can be thereby used as the head-mounted display. An insertion opening 301 is an insertion opening into which the display apparatus 200 is inserted. The entire display apparatus 200 can be inserted into the VR goggles 300 with the display surface of the display unit 205 facing the side of a head band 302 (i.e., a user side) for fixing the VR goggles 300 to the head of the user. The user can see the display unit 205 without manually holding the display apparatus 200 in a state in which the VR goggles 300 to which the display apparatus 200 is mounted are mounted on the head of the user. In this case, when the user moves the head or the entire body, the orientation of the display apparatus 200 changes. The orientation detection unit 213 detects the orientation change of the display apparatus 200 at this point, and the CPU 201 performs processing for the VR display based on the orientation change. In this case, the detection of the orientation of the display apparatus 200 by the orientation detection unit 213 is equivalent to the detection of the orientation of the head of the user (a direction that eyes of the user face). Note that the display apparatus 200 itself may be the HMD that can be mounted on the head without the VR goggles.

Note that the display apparatus 200 can perform zenith correction of the VR image using the image processing unit 204. The zenith correction is inclination correction that corrects the pitch angle or the roll angle of the VR image such that a direction in which an image in a zenith direction is shown in the VR image matches a predetermined direction (the zenith direction in VR space). The display apparatus 200 can perform the zenith correction and display the image, and can also display the image without performing the zenith correction. As described above, the digital camera 100 can also perform the zenith correction. The zenith correction may be performed in the digital camera 100 and may also be performed in the display apparatus 200.

In general, the VR image is developed by the equidistant cylindrical projection and recorded. When the VR image developed by the equidistant cylindrical projection is recorded, zenith information indicative of a zenith position (a position where an image in the zenith direction is shown) in the VR image is added as metadata. When the zenith information is used, it is possible to perform suitable VR display (VR display in which it looks as if the VR space is identical to real space, VR display in which, for example, when the display surface is directed in the zenith direction, an image in a nadir direction is displayed).

The development method for developing the VR image using the equidistant cylindrical projection includes two methods. A first development method is a method that develops the VR image using the equidistant cylindrical projection without correcting the angle (inclination) of the VR image obtained by the imaging unit, i.e., without performing the zenith correction (inclination correction). According to the first development method, it is possible to reduce the processing load and processing time of the image connection processing (processing that combines a plurality of images obtained by a plurality of imaging units to obtain a single VR image). However, the orientation (inclination) of the imaging apparatus is reflected in the VR image developed by the equidistant cylindrical projection, and hence it is not possible to easily grasp the zenith direction, the nadir direction, and a horizontal direction (a direction parallel to the ground) even when the VR image is viewed. A second development method is a method that corrects the angle (inclination) of the VR image obtained by the imaging unit based on the orientation of the imaging apparatus, i.e., performs the zenith correction, and develops the VR image having been performed the zenith correction using the equidistant cylindrical projection. In the second development method, any position at the bottom side of the VR image developed by the equidistant cylindrical projection serves as a nadir position (a position where an image in the nadir direction is shown), and any position at the top side thereof serves as a zenith position (a position where an image in the zenith direction is shown). According to the second method, the orientation of the imaging apparatus is not reflected in the VR image developed by the equidistant cylindrical projection, and hence it is possible to easily grasp the zenith direction, the nadir direction, and the horizontal direction (the direction parallel to the ground) when the VR image is viewed. However, since the zenith correction is performed, the processing load and processing time of the image connection processing are increased. The development method differs depending on the imaging apparatus. Note that, when the zenith information is used, it is possible to perform suitable VR display (VR display in which it looks as if the VR space is identical to the real space, VR display in which, for example, when the display surface is directed in the zenith direction, an image in the nadir direction is displayed) regardless of the development method.

In the first development method, in the VR image developed by the equidistant cylindrical projection, the zenith position changes according to the orientation of the imaging apparatus at the time of shooting, and the position where an image in each direction from the imaging apparatus is shown matches a predetermined position irrespective of the orientation of the imaging apparatus at the time of shooting. That is, an image on the side of the grip of the imaging apparatus (the side of the tripod) with respect to the imaging apparatus is shown at a predetermined position of the VR image developed by the equidistant cylindrical projection. For example, in the case where the grip is positioned below the imaging unit, the image on the side of the grip is shown in the bottom side portion of the VR image developed by the equidistant cylindrical projection. On the other hand, since the zenith correction is performed in the second development method, the zenith position matches a predetermined position irrespective of the orientation of the imaging apparatus at the time of shooting in the VR image developed by the equidistant cylindrical projection. The position where the image in each direction from the imaging apparatus is shown changes according to the orientation of the imaging apparatus at the time of shooting. That is, the position where the image on the side of the grip is shown changes according to the orientation of the imaging apparatus at the time of shooting.

In the case of the first development method, an area where the image on the side of the grip is shown is fixed, and hence the display control apparatus (display apparatus) that acquires the VR image developed by the equidistant cylindrical projection from the outside can determine the area where the image on the side of the grip is shown. On the other hand, in the case of the second development method, the area where the image on the side of the grip is shown is not fixed, and hence the display control apparatus cannot determine the area where the image on the side of the grip is shown. When grip position information indicative of the position or the area where the image on the side of the grip is shown is included in the metadata of the VR image, the CPU 201 can determine the area where the image on the side of the grip is shown according to the grip position information. However, the grip position information is not added to the common VR image.

Note that the imaging apparatus that generates the VR image developed by the equidistant cylindrical projection grasps the development method that uses the equidistant cylindrical projection, and hence the imaging apparatus can determine the area where the image on the side of the grip is shown irrespective of the development method. For example, even when the second development method is used, the imaging apparatus can determine the area where the image on the side of the grip is shown based on the orientation of the imaging apparatus.

Figure 3:
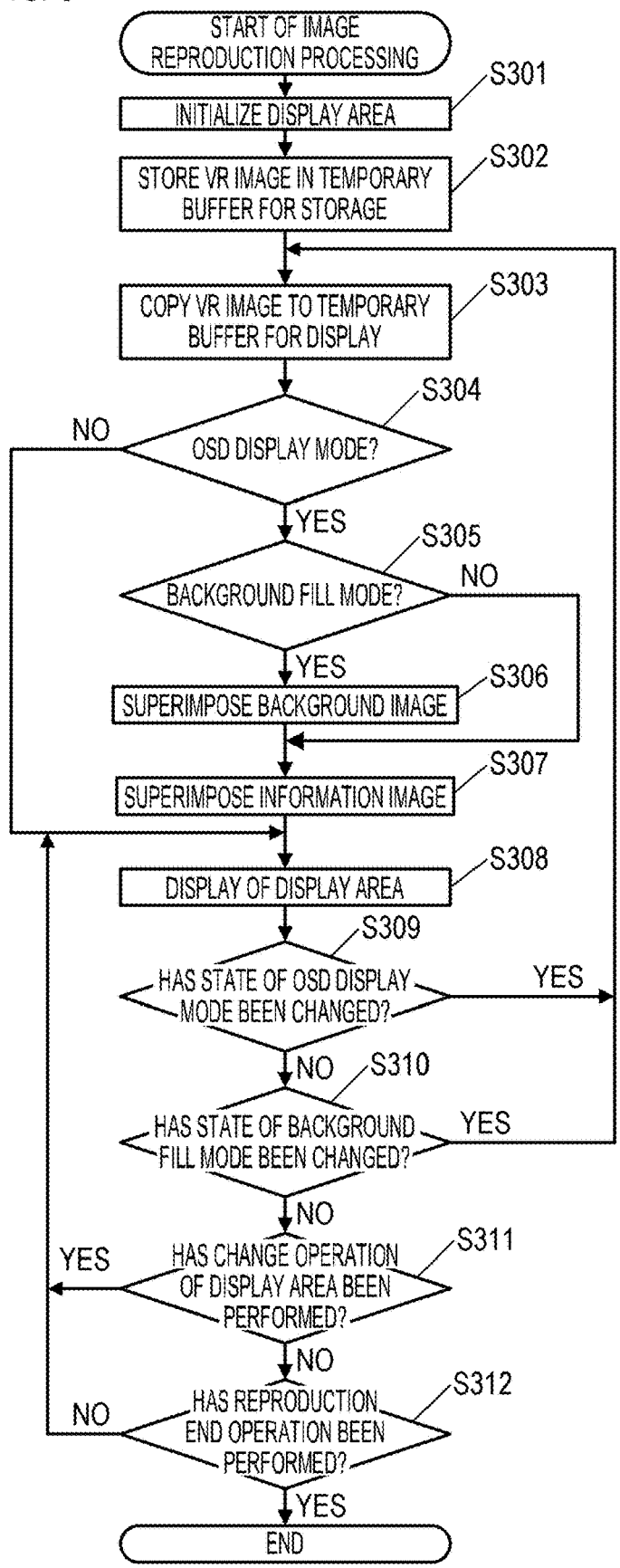
FIG. 3 is a flowchart showing image reproduction processing according to the present embodiment.

FIG. 3 is a flowchart showing an example of image reproduction processing of the display apparatus 200. The image reproduction processing in FIG. 3 is processing in the case where the display apparatus 200 is used as the image processing apparatus according to the present embodiment. The CPU 201 loads a program (e.g., a specific application program for performing the VR display of the VR image stored in the recording medium 208) stored in the non-volatile memory 203 into the memory 202 and executes the program, and the image reproduction processing in FIG. 3 is thereby implemented. The VR image stored in the recording medium 208 is the VR image captured by, e.g., the digital camera 100 or a common spherical camera.

In Step S301, the CPU 201 initializes the display area. Specifically, an area that is at a predetermined position (initial position) and has a predetermined size (initial size) is determined to be the display area by the CPU 201. The predetermined position can also be described as "a position where an image in a predetermined direction is shown". In Step S302, the CPU 201 reads the VR image (image data) developed by the equidistant cylindrical projection from the recording medium 208, and stores the VR image in a temporary buffer for storage (not shown).

In Step S303, the CPU 201 copies the VR image stored in Step S302 from the temporary buffer for storage to a temporary buffer for display (not shown). In the present embodiment, in view of processing speed required for access to the recording medium 208, a configuration is adopted in which the VR image is stored in the temporary buffer for storage, and is copied from the temporary buffer for storage to the temporary buffer for display. However, the display apparatus 200 does not need to include the temporary buffer for storage. The VR image read from the recording medium 208 in Step S302 may be directly stored in the temporary buffer for display. However, in this case, there are cases where re-reading of the VR image from the recording medium 208 is required.

In Step S304, the CPU 201 determines whether or not an on-screen display (OSD) display mode is set in the display apparatus 200. The processing proceeds to Step S305 in the case where it is determined that the OSD display mode is set, and the processing proceeds to Step S308 in the case where it is determined that the OSD display mode is not set.

In Step S305, the CPU 201 determines whether or not a background fill mode is set in the display apparatus 200. The processing proceeds to Step S306 in the case where it is determined that the background fill mode is set, and the processing proceeds to Step S307 in the case where it is determined that the background fill mode is not set.

In Step S306, in order to improve the viewability of a graphic image (information image) combined in Step S307, the CPU 201 superimposes (combines) a graphic image (background image) serving as the background of the information image on the VR image in the temporary buffer for display. In the present embodiment, the background image is superimposed on a predetermined area. Specifically, the background image is superimposed on an area having a predetermined width from the bottom side of the VR image developed by the equidistant cylindrical projection. Subsequently, the processing proceeds to Step S307. Note that the color, shape, size, and transparency of the background image are not particularly limited. The background image may be a single-colored image or a multi-colored image (may be a patterned image). The background image may have transparency that allows the VR image to be seen through the background image. The background image may have shapes such as a rectangular shape, a circular shape (including an oblong shape), or other special shapes.

In Step S307, the CPU 201 superimposes (combines) the information image on the VR image in the temporary buffer for display. Similarly to Step S306, the information image is superimposed on a predetermined area. Specifically, the information image is superimposed on an area having a predetermined width from the bottom side of the VR image developed by the equidistant cylindrical projection. In the case where the process in Step S306 has been performed, the information image is superimposed on the background image. Subsequently, the processing proceeds to Step S308.

The information image indicates information that is considered to be useful to the user, and indicates, e.g., information related to the target VR image to be displayed. Specifically, the information image indicates at least one of the image file name, file size (data size), image size, date and time of shooting, and exchangeable image file format (EXIF) information of the VR image. The EXIF information indicates setting conditions at the time of shooting and the like. The information image may also indicate information independent of the target VR image to be displayed such as, e.g., the current time and a remaining battery level of the display apparatus 200. The information image may also indicate information having nothing to do with an object of the VR image. The information image may be text (text image), and may also be an icon or a figure corresponding to information.

In the VR display, the image format of the VR image is converted from the image format of the equidistant cylindrical projection to a spherical image format. Consequently, in each of Steps S306 and S307, the graphic image (the background image or the information image) performed the opposite of the conversion from the image format of the equidistant cylindrical projection to the spherical image format is combined. With this, the graphic image having a desired shape can be displayed in the VR display. In addition, a graphic image outlined with a color different from a main color (inside color) may be used as the information image so that the viewability of the information image is improved. The outlining of the graphic image may be performed only in the case where the background fill mode is not set or the like.

The process in each of Steps S306 and S307 is the process for superimposing the graphic image on an area (specific area) where an image on a specific side (in a specific direction) with respect to the imaging apparatus having captured the target VR image to be displayed is shown. In the present embodiment, the specific side is the side of the grip of the imaging apparatus. In the case where the VR image is developed by the first development method, the zenith correction is not performed on the VR image, and hence the area having the predetermined width from the bottom side of the VR image developed by the equidistant cylindrical projection is the area where the image on the side of the grip is shown. On the other hand, in the case where the VR image is developed by the second development method, the zenith correction is performed on the VR image, and hence the area having the predetermined width from the bottom side of the VR image developed by the equidistant cylindrical projection is the area where the image in the nadir direction (ground direction) is shown. In each of the first development method and the second development method, in the case where the graphic image is rendered in the entire area having the predetermined width from the bottom side of the VR image developed by the equidistant cylindrical projection, the graphic image is displayed as a circular image in the VR display. In addition, the size (the diameter or radius) of the graphic image displayed as the circular shape changes depending on the above predetermined width.

In Step S308, the CPU 201 displays the current display area in the VR image in the temporary buffer for display in the display unit 205. In the case where the OSD display mode is not set, the processes in Steps S305 to S307 are omitted, and hence neither the background image nor the information image is displayed. In the case where the OSD display mode is set, the process in Step S307 is performed, and hence the information image is displayed in the area where the image on the side of the grip of the imaging apparatus or the image in the nadir direction is shown according to the development method of the VR image. Specifically, in the case where the development method of the VR image is the first development method (without the zenith correction), the information image is displayed in the area where the image on the side of the grip is shown (in the case where the area where the image on the side of the grip is shown is not included in the display area, the information image is not displayed). In the case where the development method of the VR image is the second development method (with the zenith correction), the information image is displayed in the area where the image in the nadir direction is shown (in the case where the area where the image in the nadir direction is shown is not included in the display area, the information image is not displayed).

In Step S309, the CPU 201 determines whether or not the setting state of the OSD display mode has been changed. That is, the CPU 201 determines whether or not the setting state thereof has been switched between an enabled state in which the OSD display mode is set and a disabled state in which the OSD display mode is not set. The processing proceeds to Step S310 in the case where it is determined that the OSD display mode has not been changed, and the processing returns to Step S303 in the case where it is determined that the OSD display mode has been changed. Note that the CPU 201 may switch the setting state of the OSD display mode in response to the user operation. The CPU 201 may automatically switch the setting state of the OSD display mode based on the use status of the display apparatus 200, the type of the VR image, and the viewing status of the VR image.

In Step S310, the CPU 201 determines whether or not the setting state of the background fill mode has been changed. That is, the CPU 201 determines whether or not the setting state thereof has been switched between an enabled state in which the background fill mode is set and a disabled state in which the background fill mode is not set. The processing proceeds to Step S311 in the case where it is determined that the background fill mode has not been changed, and the processing returns to Step S303 in the case where it is determined that the background fill mode has been changed. Note that the CPU 201 may switch the setting state of the background fill mode in response to the user operation. The CPU 201 may automatically switch the setting state of the background fill mode based on the use status of the display apparatus 200, the type of the VR image, and the viewing status of the VR image.

Thus, when the setting state of the OSD display mode or the setting state of the background fill mode is changed, the processing returns to Step S303 from Step S309 or Step S310. Subsequently, in Step S303, the process for copying the VR image from the temporary buffer for storage to the temporary buffer for display is performed again (resetting of the VR image in the temporary buffer for display). As described above, the display apparatus 200 may directly store the VR image in the recording medium 208 in the temporary buffer for display instead of including the temporary buffer for storage. In this case, when the setting state of the OSD display mode or the setting state of the background fill mode is changed, the process for reading the VR image in the recording medium 208 is performed again. That is, access to the recording medium 208 occurs. An increase of the access to the recording medium 208 sometimes causes the delay of subsequent processes, and causes a reduction in the processing speed of the entire image reproduction processing.

In Step S311, the CPU 201 determines whether or not a change operation for changing the display area has been performed. The change operation of the display area is an operation for changing at least one of the position and the size of the display area, and includes a touch operation (Touch-Move or the pinch) performed on the touch panel 206a, and change of the orientation of the display apparatus 200. In the case where it is determined that the change operation of the display area has been performed, the CPU 201 updates the display area according to the change operation, and returns the processing to Step S308. As a result, the display of the display unit 205 is updated such that the display area after the update is displayed in the display unit 205. The processing proceeds to Step S312 in the case where it is determined that the change operation of the display area has not been performed.

In Step S312, the CPU 201 determines whether or not a reproduction end operation (an operation for ending the image reproduction processing) has been performed. In the case where it is determined that the reproduction end operation has been performed, the CPU 201 ends the image reproduction processing. In the case where it is determined that the reproduction end operation has not been performed, the processing returns to Step S308.

In the VR image, it is likely that the hand of the photographer or the tripod appears in the area where the image on the side of the grip of the imaging apparatus is shown, and it is likely that the image value of the area is low. That is, it is unlikely that a viewer wants to view the area or the photographer wants to show the viewer the area. In addition, it is likely that the image value of the area where the image in the nadir direction (ground direction) is shown is low. According to the above image reproduction processing, it is possible to superimpose the graphic image on the area where the image on the side of the grip of the imaging apparatus is shown or the area where the image in the nadir direction is shown. With this, it is possible to effectively use the area having the low image value to display the graphic image. As a result, the user can view the VR image (the portion of the graphic image and the other portions) (almost) without feeling hindrance caused by the graphic image that prevents the user from viewing an object that the user wants to view (an improvement in convenience).

Figure 4:
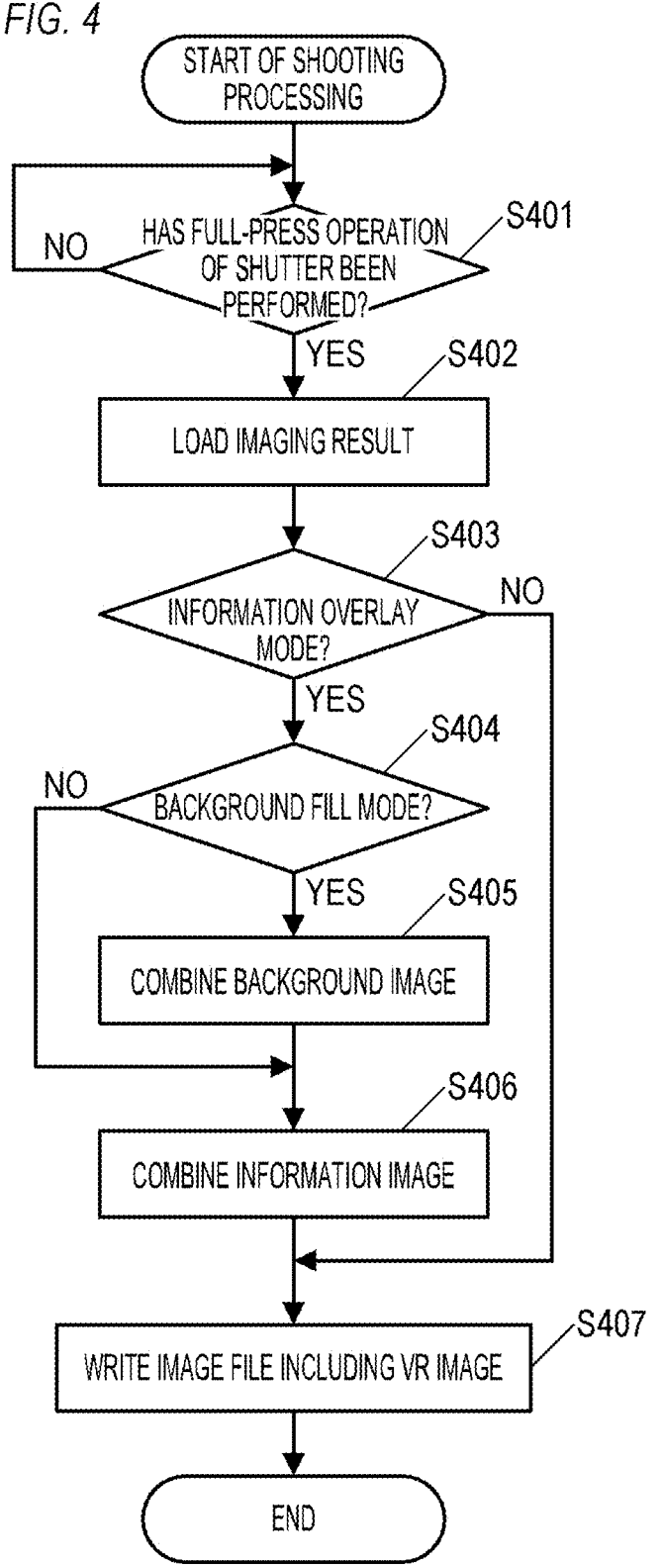
FIG. 4 is a flowchart showing shooting processing according to the present embodiment.

FIG. 4 is a flowchart showing an example of shooting processing of the digital camera 100. The shooting processing in FIG. 4 is processing in the case where the digital camera 100 is used as the image processing apparatus according to the present embodiment. The system control unit 50 loads a program stored in the non-volatile memory 56 into the system memory 52 and executes the program, and the shooting processing is thereby implemented.

In Step S401, the system control unit 50 determines whether or not the full-press operation of the shutter button 61 has been performed. That is, the system control unit 50 determines whether or not the second shutter switch signal SW2 generated by turning ON the second shutter switch 64 has been generated. The process in Step S401 is repeated until it is determined that the full-press operation of the shutter button 61 has been performed, and the processing proceeds to Step S402 when it is determined that the full-press operation of the shutter button 61 has been performed.

In Step S402, the system control unit 50 writes (loads) the imaging results of the imaging units 22a and 22b into the memory 32. Herein, two images captured by the imaging units 22a and 22b are analyzed, and the image connection processing including the development by the first development method (without the zenith correction) is performed. With this, a single VR image developed by the equidistant cylindrical projection such that an area having a predetermined width from the bottom side matches an area where an image on the side of the grip of the digital camera 100 is shown is generated. Subsequently, the generated VR image is written into the memory 32.

In Step S403, the system control unit 50 determines whether or not an information overlay mode is set in the digital camera 100. The processing proceeds to Step S404 in the case where it is determined that the information overlay mode is set, and the processing proceeds to Step S407 in the case where it is determined that the information overlay mode is not set.

In Step S404, the system control unit 50 determines whether or not the background fill mode is set in the digital camera 100. The processing proceeds to Step S405 in the case where it is determined that the background fill mode is set, and the processing proceeds to Step S406 in the case where it is determined that the background fill mode is not set.

In Step S405, in order to improve the viewability of an information image combined in Step S406, the system control unit 50 combines (superimposes) a background image serving as the background of the information image with the VR image stored in the memory 32. Herein, the background image is superimposed on the area having the predetermined width from the bottom side of the VR image developed by the equidistant cylindrical projection. As described above, the area having the predetermined width from the bottom side is the area where the image on the side of the grip of the digital camera 100 is shown. Consequently, the background image is superimposed on the area where the image on the side of the grip is shown. Subsequently, the processing proceeds to Step S406. Note that, similarly to the image reproduction processing in FIG. 3, the color, shape, size, and transparency of the background image combined in Step S405 are not particularly limited.

In Step S406, the system control unit 50 combines (superimposes) the information image with the VR image stored in the memory 32. Herein, the information image is superimposed on the area having the predetermined width from the bottom side of the VR image developed by the equidistant cylindrical projection, i.e., the area where the image on the side of the grip of the digital camera 100 is shown. In the case where the process in Step S405 has been performed, the information image is superimposed on the background image. Subsequently, the processing proceeds to Step S407. Note that, similarly to the image reproduction processing in FIG. 3, the information image combined in Step S406 indicates information that is considered to be useful to the user (the image file name, image size, date and time of shooting, and EXIF information of the VR image stored in the memory 32). Simple information such as the date and time of shooting or the like is combined in a conventional silver-halide film camera, and hence it is probably appropriate to combine the simple information such as the date and time of shooting or the like with the VR image that is captured and outputted by the imaging apparatus. That is, the information image combined in Step S406 preferably indicates the simple information such as the date and time of shooting of the VR image stored in the memory 32 or the like.

Note that, similarly to the image reproduction processing in FIG. 3, in each of Steps S405 and S406, the graphic image (the background image or the information image) performed the opposite of the conversion from the image format of the equidistant cylindrical projection to the spherical image format is combined. With this, the graphic image having a desired shape can be displayed in the VR display. Note that a graphic image outlined with a color different from a main color (inside color) may be used as the information image so that the viewability of the information image is improved.

In Step S407, the system control unit 50 generates an image file that includes the VR image (image data) stored in the memory 32, and writes the image file into the recording medium 90. Subsequently, the system control unit 50 ends the shooting processing. In the case where the information overlay mode is set, the VR image (combined image) with which the information image is combined is written into the recording medium 90. In the case where the information overlay mode is not set, the VR image with which neither the information image nor the background image is combined is written into the recording medium 90. Note that, when the image file is generated, the system control unit 50 generates zenith information based on the orientation of the digital camera 100 at the time of shooting of the VR image, and adds the zenith information to the VR image as metadata.

As described by using FIG. 3, it is likely that the image value of the area where the image on the side of the grip of the imaging apparatus is shown is low. According to the above shooting processing, the graphic image is superimposed on the area where the image on the side of the grip of the imaging apparatus is shown. With this, in the VR display of the combined image generated by the above shooting processing, it is possible to use the area having the low image value to display the graphic image. As a result, the user can view the VR image (the portion of the graphic image and the other portions) (almost) without feeling the hindrance caused by the graphic image (an improvement in convenience).

Figure 5A:
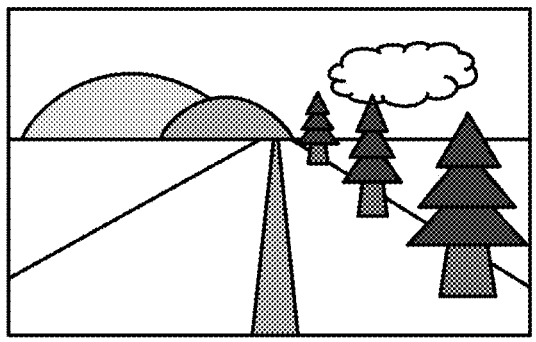
FIGS. 5A to 5D are views showing VR display according to the present embodiment.
Figure 5B:
Figure 5C:
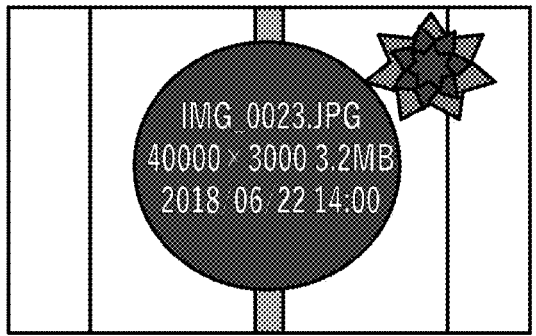
Figure 5D:
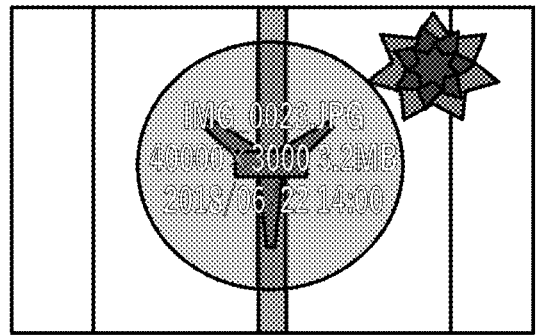

FIGS. 5A to 5D show examples of the VR display of the VR image captured by the spherical camera installed on a road by using the tripod. According to the processing in each of FIGS. 3 and 4, it is possible to perform the VR display shown in FIGS. 5A to 5D. In FIG. 5A, the area where the image on the side of the grip of the imaging apparatus is shown is not displayed, and neither the hand of the photographer nor the tripod is displayed. In this case, the graphic image such as the information image or the like is not displayed, and the viewing of the VR image is not hindered by the graphic image. In FIG. 5B, the area where the image on the side of the grip of the imaging apparatus is shown is displayed, and the tripod is displayed. In this case, the information image is superimposed and displayed on the area where the image on the side of the grip of the imaging apparatus is shown (the area of the tripod). It is likely that the image value of the area where the image on the side of the grip of the imaging apparatus is shown (the area of the tripod) is low, and hence, even when the information image is displayed, the user can view the VR image (the portion of the information image and the other portions) (almost) without feeling the hindrance caused by the information image. In the case where the background fill mode is set, instead of the display in FIG. 5B, the display in each of FIGS. 5C and 5D is performed. In each of FIGS. 5C and 5D, the background image is displayed behind the information image. FIG. 5C shows the case where the background image does not have transparency, and FIG. 5D shows the case where the background image has transparency.

Figure 6A:
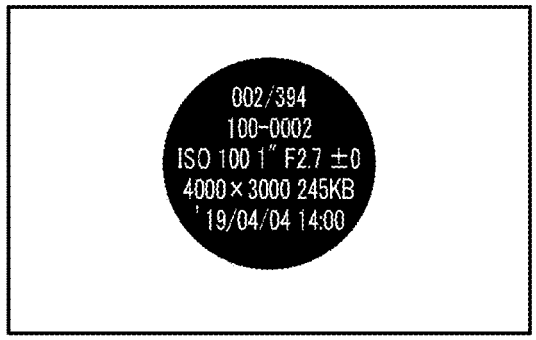
FIGS. 6A, 6C, and 6D are views showing the VR display according to the present embodiment.
Figure 6B:
FIG. 6B is a view showing the VR display according to the present embodiment.

FIG. 6A shows an example of the VR display in which the graphic image is displayed at the center of the display surface. In the graphic image in FIG. 6A, text (information image) is described in a circular solid image (background image). FIG. 6B shows an example of the VR image that is developed by the equidistant cylindrical projection and is combined with the graphic image. According to the processing in each of FIGS. 3 and 4, as shown in FIG. 6B, the graphic image is combined with the entire area having the predetermined width from the bottom side of the VR image developed by the equidistant cylindrical projection so that the display in FIG. 6A can be implemented. The graphic image in FIG. 6B is the graphic image performed the opposite of the conversion from the image format of the equidistant cylindrical projection to the spherical image format. In the VR image, the image format of the VR image is converted from the image format of the equidistant cylindrical projection to the spherical image format. Accordingly, the form of the graphic image in FIG. 6B is different from the form of the graphic image in FIG. 6A (the graphic image in FIG. 6B is distorted with respect to the graphic image in FIG. 6A).

Figure 6C:
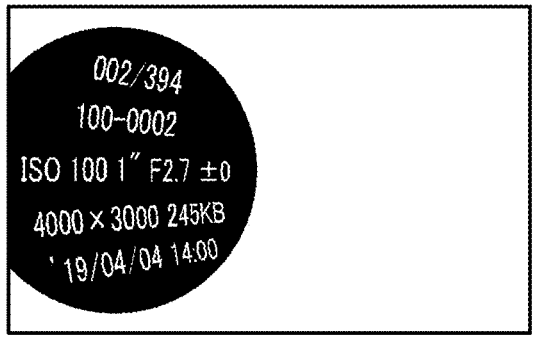
Figure 6D:
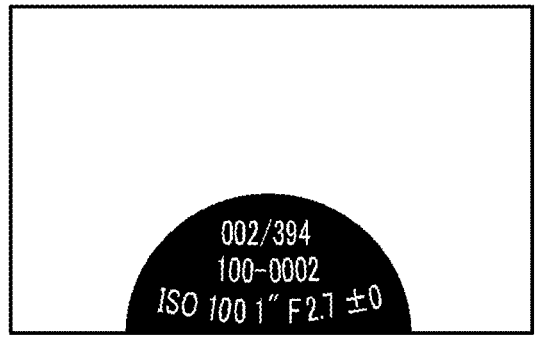

The area of the graphic image in the VR image in FIG. 6B is fixed, and hence, in the VR display of the VR image in FIG. 6B, the display position of the graphic image changes as the display area changes. For example, when the display area moves to the right from the area in FIG. 6A, as shown in FIG. 6C, the display position of the graphic image moves to the left. When the display area moves upward from the area in FIG. 6A, as shown in FIG. 6D, the display position of the graphic image moves downward.

Note that the various control operations described above as the control operations performed by the system control unit 50 may be performed by a piece of hardware, or a plurality of pieces of hardware (e.g., a plurality of processors or circuits) may share processes and thereby control the entire apparatus. Similarly, the various control operations described above as the control operations performed by the CPU 201 may be performed by a piece of hardware, or a plurality of pieces of hardware (e.g., a plurality of processors or circuits) may share processes and thereby control the entire apparatus.

The present invention has been described in detail based on the preferred embodiments, but the present invention is not limited to the specific embodiments, and various embodiments without departing from the gist of the invention are also included in the present invention. Further, the individual embodiments described above are only illustrative of exemplary embodiments of the present invention, and the embodiments may be appropriately combined with each other. For example, it is only required that the specific area is the area that is expected to have a relatively low image value, and the specific area does not need to be the area where the image on the side of the grip of the imaging apparatus is shown. It is only required that the graphic image can be superimposed on the specific area, and the graphic image may be superimposed on an area performed the zenith correction or may also be superimposed on an image different from the image developed by the equidistant cylindrical projection.

In addition, in each embodiment described above, the description has been made by using, as an example, the case where the present invention is applied to the digital camera or the display apparatus, but the present invention is not limited to the example, and the present invention can be applied to any apparatus (electronic equipment) capable of performing image processing on the VR image. For example, the present invention can be applied to a personal computer, a PDA, a cellular phone terminal, a portable image viewer, a printer apparatus, a digital photo frame, a music player, a game machine, an electronic book reader, and a video player. In addition, the present invention can also be applied to a television apparatus, a projection apparatus, a tablet terminal, a smart phone, an AI speaker, a home electronic appliance, a vehicle-mounted apparatus, and medical equipment.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-166930, filed on Sep. 6, 2018, which is hereby incorporated by reference herein in its entirety.

What is claimed is:

1. An electronic device comprising:
a processor; and
a memory storing a program which, when executed by the processor, causes the electronic device to:
acquire an image and orientation information corresponding to an orientation of an image capturing apparatus;
develop the image by equidistant cylindrical projection;
superimpose a graphic image on an area of a predetermined width from a bottom side or a top side of the developed image before inclination correction based on the orientation information is performed; and
perform a conversion from an image format of the equidistant cylindrical projection to a spherical image format, on the developed image having the superimposed graphic image,
wherein the bottom side or the top side of the developed image without performing the inclination correction is a side of a grip of the image capturing apparatus, and
wherein, after the inclination correction is performed, a part of the image converted to the spherical image format is displayed on a screen according to a user operation, and the graphic image is visible when a part of the image captured toward the side of the grip of the image capturing apparatus is displayed on the screen.

2. The electronic device according to claim 1, wherein the graphic image is converted from a spherical image format to an image format of the equidistant cylindrical projection and the converted graphic image in the image format of the equidistant cylindrical projection is superimposed on the developed image.

3. The electronic device according to claim 1, wherein the graphic image indicates at least one of a file name of the image, a capturing date and time of the image, a size of the image, and exchangeable image file format (EXIF) information of the image.

4. The electronic device according to claim 1, wherein the graphic image indicates information independent of the image.

5. The electronic device according to claim 1, wherein the graphic image indicates information having nothing to do with an object of the image.

6. A control method of an electronic device, comprising:
acquiring an image and orientation information corresponding to an orientation of an image capturing apparatus;
developing the image by equidistant cylindrical projection;
superimposing a graphic image on an area of a predetermined width from a bottom side or a top side of the developed image before inclination correction based on the orientation information is performed; and
performing a conversion from an image format of the equidistant cylindrical projection to a spherical image format, on the developed image having the superimposed graphic image,
wherein the bottom side or the top side of the developed image without performing the inclination correction is a side of a grip of the image capturing apparatus, and
wherein, after the inclination correction is performed, a part of the image converted to the spherical image format is displayed on a screen according to a user operation, and the graphic image is visible when a part of the image captured toward the side of the grip of the image capturing apparatus is displayed on the screen.

7. A non-transitory computer readable medium that stores a program,
wherein the program causes a computer to execute a control method of an electronic device, the control method comprising:
acquiring an image and orientation information corresponding to an orientation of an image capturing apparatus;
developing the image by equidistant cylindrical projection;
superimposing a graphic image on an area of a predetermined width from a bottom side or a top side of the developed image before inclination correction based on the orientation information is performed; and
performing a conversion from an image format of the equidistant cylindrical projection to a spherical image format, on the developed image having the superimposed graphic image,
wherein the bottom side or the top side of the developed image without performing the inclination correction is a side of a grip of the image capturing apparatus, and
wherein, after the inclination correction is performed, a part of the image converted to the spherical image format is displayed on a screen according to a user operation, and the graphic image is visible when a part of the image captured toward the side of the grip of the image capturing apparatus is displayed on the screen.

* * * * *